US012705872B2

(12) United States Patent
Batalov et al.

(10) Patent No.: US 12,705,872 B2
(45) Date of Patent: Aug. 11, 2026

(54) SYSTEMS AND METHODS FOR CONTRASTIVE FINE-TUNING OF IMAGE-TEXT MACHINE LEARNING MODELS

(71) Applicant: Robert Bosch GmbH, Stuttgart (DE)

(72) Inventors: Ivan Batalov, Pittsburgh, PA (US); Chaithanya Kumar Mummadi, Pittsburgh, PA (US); Wan-Yi Lin, Wexford, PA (US)

(73) Assignee: Robert Bosch GmbH (DE)

( * ) Notice: Subject to any disclaimer, the term of this patent is extended or adjusted under 35 U.S.C. 154(b) by 262 days.

(21) Appl. No.: 18/413,775

(22) Filed: Jan. 16, 2024

(65) Prior Publication Data

US 2025/0232570 A1 Jul. 17, 2025

(51) Int. Cl.

| | |
|---|---|
| ***G06V 10/00*** | (2022.01) |
| ***G06V 10/82*** | (2022.01) |
| ***G06V 20/40*** | (2022.01) |
| ***G06V 20/56*** | (2022.01) |

(52) U.S. Cl.

CPC .............. *G06V 10/82* (2022.01); *G06V 20/41* (2022.01); *G06V 20/56* (2022.01)

(58) Field of Classification Search

CPC ........ G06N 20/00; G06N 20/10; G06N 20/20; G06V 10/82; G06V 10/761; G06V 10/762; G06V 10/763; G06V 10/764; G06V 10/765; G06V 10/7715; G06V 10/85; G06V 20/41; G06V 20/56

See application file for complete search history.

(56) References Cited

U.S. PATENT DOCUMENTS

| | | | | |
|---|---|---|---|---|
| 10,832,062 | B1 * | 11/2020 | Evans | G06V 10/761 |
| 11,003,959 | B1 * | 5/2021 | Levner | G06N 3/0499 |
| 11,301,718 | B2 * | 4/2022 | Hamedi | G06V 10/764 |
| 11,521,386 | B2 * | 12/2022 | Chung | G06N 3/08 |
| 11,599,741 | B1 * | 3/2023 | Xue | G06N 20/00 |
| 12,223,549 | B2 * | 2/2025 | Bouëtté | G06Q 40/08 |
| 12,322,209 | B2 * | 6/2025 | Nguyen | G06V 10/776 |
| 12,354,306 | B2 * | 7/2025 | Adeel | G06V 10/774 |

(Continued)

OTHER PUBLICATIONS

Sachin Goyal et al, Finetune Like you Pretain: Improved Finetuning of Zero-Shot Vision Models, Carnegie Mellon University et al, Dec. 1, 2022, pp. 1-19.

(Continued)

*Primary Examiner* — Amir Alavi

(74) *Attorney, Agent, or Firm* — Dickinson Wright PLLC

(57) ABSTRACT

A method for fine tuning a pre-trained machine learning model includes receiving, from a pre-trained machine learning model, at least one image embedding corresponding to first training data used to train the pre-trained machine learning model. The method also includes receiving, from the pre-trained machine learning model, at least one text embedding corresponding to the at least one image embedding. The method also includes generating at least one perturbation vector that includes the at least one image embedding, the at least one text embedding, a perturbation magnitude value, and a perturbation direction value. The method also includes generating second training data based on the at least one perturbation vector, and fine tuning the pre-trained machine learning model using the second training data.

20 Claims, 10 Drawing Sheets

(56) References Cited

U.S. PATENT DOCUMENTS

| | | | | |
|---|---|---|---|---|
| 12,430,949 | B2 * | 9/2025 | Bhanushali | G06V 20/58 |
| 2024/0127563 | A1 * | 4/2024 | Koujan | G06T 11/00 |
| 2024/0220856 | A1 * | 7/2024 | Schreiber | G06N 3/084 |
| 2025/0232570 | A1 * | 7/2025 | Batalov | G06V 20/56 |

OTHER PUBLICATIONS

Alec Radford et al, Learning Transferable Visual Models from Natural Language Supervision, Feb. 26, 2021, pp. 1-48.

* cited by examiner

SYSTEMS AND METHODS FOR CONTRASTIVE FINE-TUNING OF IMAGE-TEXT MACHINE LEARNING MODELS

TECHNICAL FIELD

The present disclosure relates to the training and/or fine-tuning machine learning models, and in particular to systems and methods for robust contrastive fine-tuning of image-text machine learning models.

BACKGROUND

Increasingly, machine learning models, such as contrastive language-image pre-training (CLIP) models, are being trained to learn joint representations of images and corresponding textual captions written in natural language. Such models do so by maximizing a dot product of a latent representations of each pair of corresponding image and text, while minimizing such dot product for any mismatched pairs of images and text. As such, a trained CLIP model can be used in zero-shot image classification tasks. To do so, natural language descriptions of each possible class are used as inputs to the CLIP model along with the images to be classified. Dot products between each image representation and all class description representations are compared and the class that yields the highest dot product is chosen as the predicted class.

Additionally, to improve the classification accuracy of a CLIP model on a specific type of data, the CLIP machine learning model may be fine-tuned via additional training on such data. For example, fine-tuning using the same exact loss function that is used for training the original CLIP model (e.g., a contrastive loss function) results in improved model accuracy on the in-distribution (ID) dataset used for fine-tuning, on other out-of-distribution datasets (OoD) that are not used for training, and on "corrupted" version of the ID data (e.g., providing better natural robustness).

SUMMARY

An aspect of the disclosed embodiments includes a method for fine tuning a pre-trained machine learning model. The method includes receiving, from a pre-trained machine learning model, at least one image embedding corresponding to first training data used to train the pre-trained machine learning model. The method also includes receiving, from the pre-trained machine learning model, at least one text embedding corresponding to the at least one image embedding. The method also includes generating at least one perturbation vector that includes the at least one image embedding, the at least one text embedding, a perturbation magnitude value, and a perturbation direction value. The method also includes generating second training data based on the at least one perturbation vector, and fine tuning the pre-trained machine learning model using the second training data.

Another aspect of the disclosed embodiments includes a system for fine tuning a pre-trained machine learning model. The system includes a processor, and a memory. The memory includes instructions that, when executed by the processor, cause the processor to: receive, from a pre-trained machine learning model, at least one image embedding corresponding to first training data used to train the pre-trained machine learning model; receive, from the pre-trained machine learning model, at least one text embedding corresponding to the at least one image embedding; generate at least one perturbation vector that includes the at least one image embedding, the at least one text embedding, a perturbation magnitude value, and a perturbation direction value; generate second training data based on the at least one perturbation vector; and fine tune the pre-trained machine learning model using the second training data.

Another aspect of the disclosed embodiments includes an apparatus for controlling a machine. The apparatus includes a processor, and a memory. The memory includes instructions that, when executed by the processor, cause the processor to: receive, from a pre-trained machine learning model, at least one image embedding corresponding to first training data used to train the pre-trained machine learning model; receive, from the pre-trained machine learning model, at least one text embedding corresponding to the at least one image embedding; generate at least one perturbation vector that includes the at least one image embedding, the at least one text embedding, a perturbation magnitude value, and a perturbation direction value; generate second training data based on the at least one perturbation vector; fine tune the pre-trained machine learning model using the second training data; receive, from the fine-tuned pre-trained machine learning model, classified sensor data corresponding to at least one sensor of machine; and selectively controlling the machine based on the classified sensor data.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, increasingly, machine learning models, such as CLIP models, are being trained to learn joint representations of images and corresponding textual captions written in natural language. Such models do so by maximizing a dot product of a latent representations of each pair of corresponding image and text, while minimizing such dot product for any mismatched pairs of images and text. As such, a trained CLIP model can be used in zero-shot image classification tasks. To do so, natural language descriptions of each possible class are used as inputs to the CLIP model along with the images to be classified. Dot products between each image representation and all class description representations are compared and the class that yields the highest dot product is chosen as the predicted class.

Additionally, to improve the classification accuracy of a CLIP model on a specific type of data, the CLIP machine learning model may be fine-tuned via additional training on such data. For example, fine-tuning using the same exact loss function that is used for training the original CLIP model (e.g., a contrastive loss function) results in improved model accuracy on the ID dataset used for fine-tuning, on other OoD dataset that are not used for training, and on "corrupted" version of the ID data (e.g., providing better natural robustness).

Figure 3A:
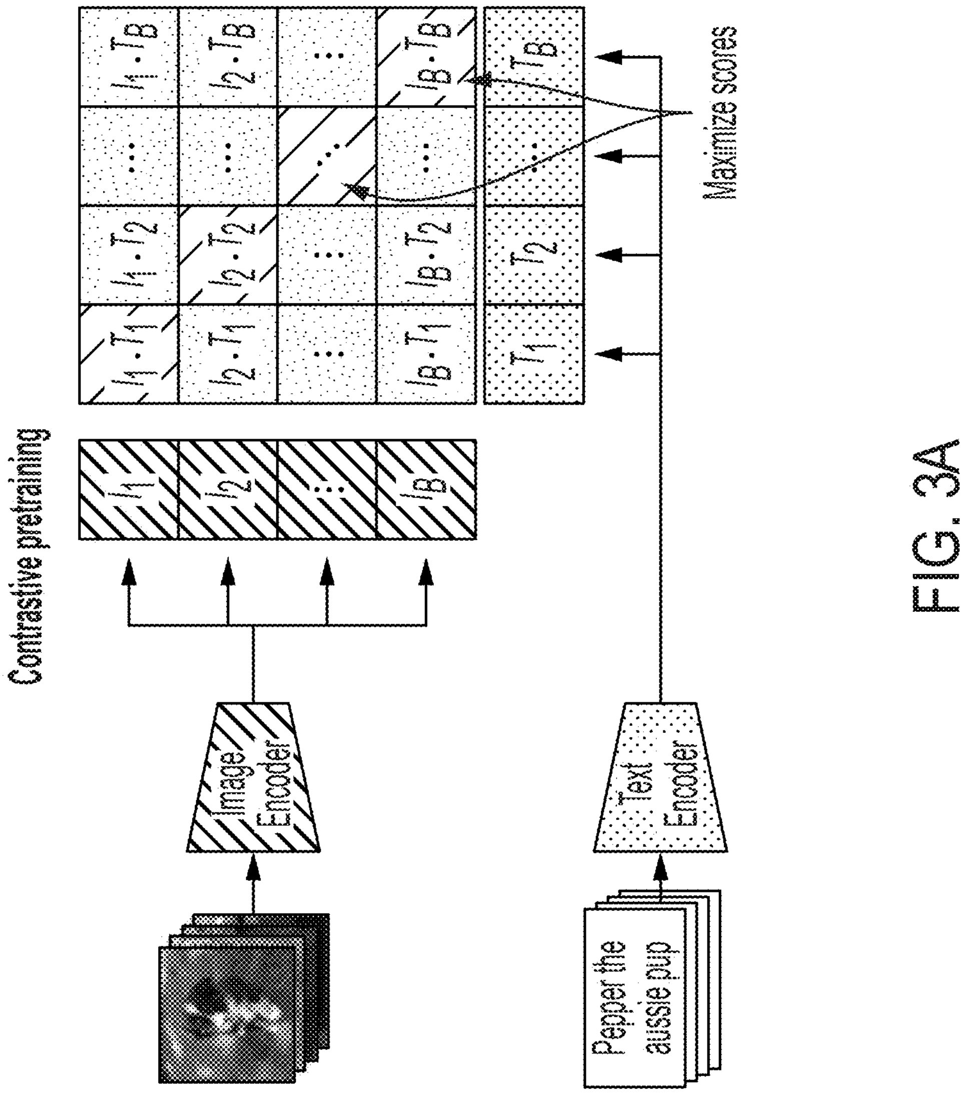
FIG. 3A generally illustrates a contrastive pre-training function according to the principles of the present disclosure.

Accordingly, systems and methods, such as the systems and methods described herein, configured to fine-tune machine learning models, such as CLIP machine learning models, may be desirable. In some embodiments, the systems and methods described herein may be configured to, during CLIP model training, configure a machine learning model, as is generally illustrated in FIG. 3A, to learn joint representation of images and corresponding captions written in natural language. The machine learning model may include of two encoders f and g, where f takes images ($I_i$, i=1 . . . B, where B is the number of image-text pairs in the batch) as input and g takes text ($T_i$) as input. Both f and g produce an embedding (e.g., a latent representation) of the corresponding input $f(I_i) \in \mathbb{R}^N$ and $g(T_i) \in \mathbb{R}^N$. The systems and methods described herein may be configured to pre-train the machine learning model to align the embedding $f(I_i)$ of an image close to the embedding $g(T_i)$ of the corresponding text description, and away from other text embeddings $g(T_j)$ in the batch. Given a batch with B images with corresponding text descriptions $D=\{(I_1, T_1), \ldots (I_B, T_B)\}$, pretraining objective is as follows:

$$\mathcal{L}_{pre}(D, \theta) :=$$

$$\sum_{i=1}^{B} -\log \frac{\exp(\overline{f}(I_i) \cdot \overline{g}(T_i))}{\sum_{j=1}^{B} \exp(\overline{f}(I_i) \cdot \overline{g}(T_j))} + \sum_{i=1}^{B} -\log \frac{\exp(\overline{f}(I_i) \cdot \overline{g}(T_i))}{\sum_{j=1}^{B} \exp(\overline{f}(I_i) \cdot \overline{g}(T_j))}$$

where $\theta=[\theta_{img}; \theta_{text}]$ are image and text encoder parameters, and $\bar{f}$ and $\bar{g}$ are the $l_2$ normalized versions of f and g respectively.

Because the pre-trained image embeddings are trained to be aligned with the text embeddings, the systems and methods described herein may be configured to perform a zero-shot classification without updating any weights. Given k classes (names) $\{c_1, c_2, \ldots c_k\}$, corresponding text descriptions $\{T_1, \ldots T_k\}$ may be constructed using templates (e.g., "a photo of a $$c_i'').$$

The zero-shot prediction corresponding to image I is arg $\max_i(\bar{g}(T_i)^T \cdot \bar{f}(I))$, where $\bar{g}$ and $\bar{f}$ are the normalized text and image embeddings, which may be described according to $$\operatorname{argmax}_i(h_{zs}^T \cdot \overline{f}(I)),$$

where $h_{zs} \in \mathbb{R}^{d \times k}$ is the zero-shot linear head with columns corresponding to text descriptions of the classes $T_k$. The systems and methods described herein may be configured to use multiple templates and sample the text prompt from some $p_{text}(\cdot|y)$ and ensemble predictions over multiple prompts.

Figure 3B:
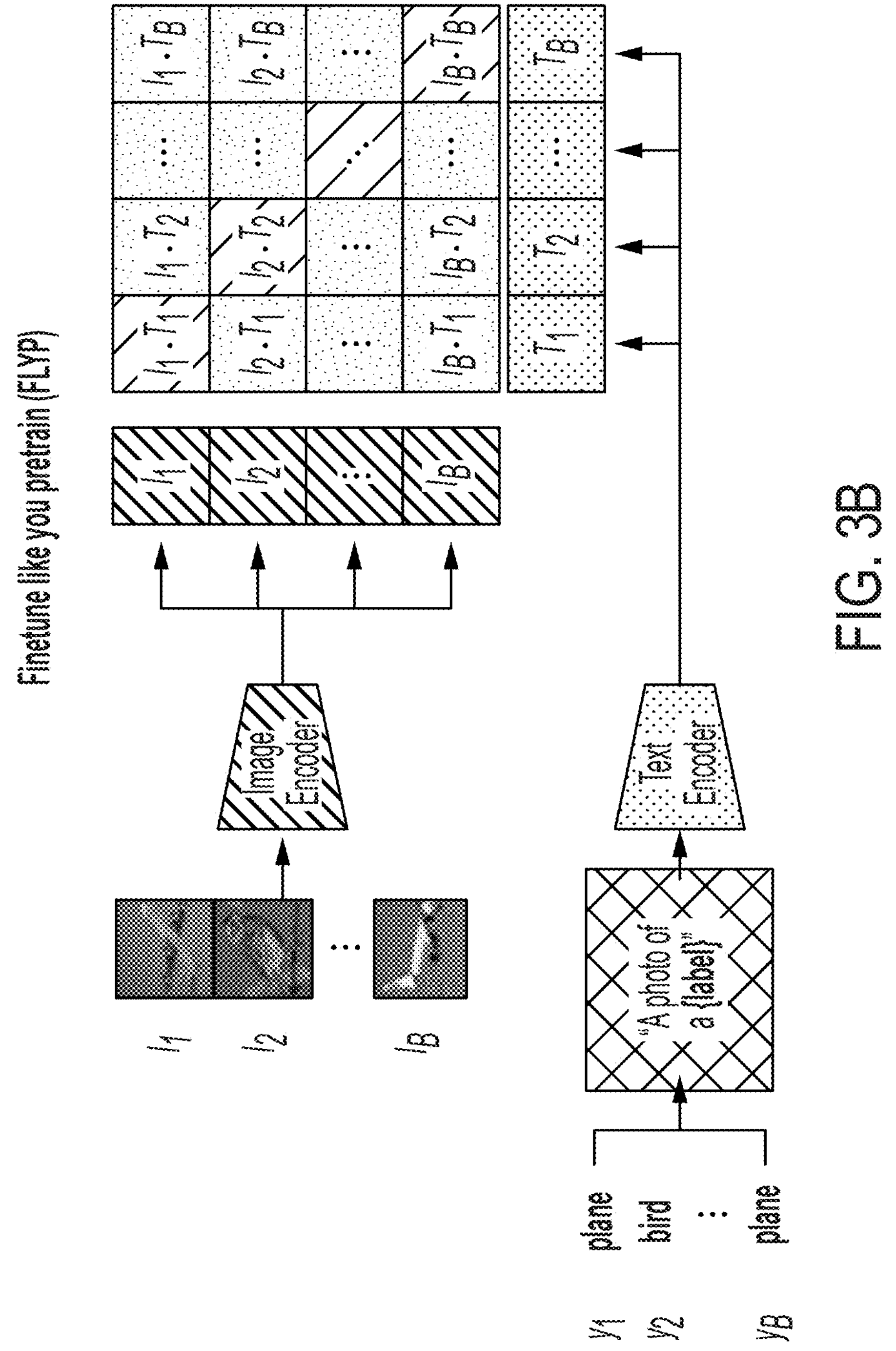
FIG. 3B generally illustrates fine-tune like you pre-train function according to the principles of the present disclosure.

In some embodiments, the systems and methods described herein may be configured to perform a fine-tune like you pre-train (FLYP) function, as is generally illustrated in FIG. 3B. For example, the systems and methods described herein may be configured to improve the classification accuracy of a CLIP model on a specific dataset while maintaining high performance on OoD datasets. The systems and methods described herein may be configured to adjust the weights of the image encoder to minimize the same contrastive loss that was used in the original CLIP. FLYP consistently outperforms other fine-tuning methods in zero shot, distribution shift, transfer learning, and few-shot learning benchmarks. In total, these benchmarks establish contrastive fine-tuning as a simple, and intuitive approach for supervised fine-tuning of image-text models like CLIP.

In some embodiments, the systems and methods described herein may be configured to improve natural and adversarial robustness of a fine-tuned CLIP machine learning model by perturbing the image representations of the CLIP machine learning model in the direction of either a text representation of a wrong class label or an image representation corresponding to a different class.

In some embodiments, the systems and methods described herein may be configured to improve natural and adversarial robustness of a fine-tuned CLIP machine learning model by perturbing the image representations of the CLIP machine learning model in the direction of either a text representation of a wrong class label or an image representation corresponding to a different class.

In some embodiments, the systems and methods described herein may be configured to receive sensor signals from any suitable sensor (e.g., including, but not limited to those described herein). In some embodiments, the systems and methods described herein may be configured to compute a control signal for controlling a physical system, such as a computer-controlled machine (e.g., such as a robot, a vehicle, a domestic appliance, a power tool, a manufacturing machine, a personal assistant, and/or an access control system), and/or any other suitable machine including, but not limited to, those described herein. In some embodiments, the systems and methods described herein may be configured to classify sensor data. In some embodiments, the systems and methods described herein may be configured to train a machine learning system that can be used for any suitable application, including, but not limited to those described herein, for example, those described with respect to FIGS. 5-11.

In some embodiments, the systems and methods described herein may be configured to introduce a modification in the FLYP procedure that perturb the normalized image embeddings using the embeddings of other images or the embeddings of other text labels in the batch. Using the notation described herein, this perturbation can be expressed as follows:

$$\bar{f}_p(I_i) = \text{normalize}\left(\bar{f}(I_i) + \text{detach}(\alpha v_j)\right)$$

$$v_j = \begin{cases} \bar{f}(I_j) \\ \text{or} \\ \bar{g}(T_j) \end{cases}$$

where $\bar{f}_p(I_i)$ is the perturbed normalized image embedding, $v_j$ is the perturbation vector, $\bar{f}(I_j)$ and $\bar{g}(T_j)$ are the unperturbed image and text embeddings, and $\alpha$ is the perturbation magnitude. The systems and methods described herein may be configured to determine or select the image or text embedding to use for perturbation direction, (e.g., the choice of j) according to at least one of:

$$j = \underset{j \neq i}{\text{argmin}}\left(\bar{f}(I_i) \cdot \bar{v}_j\right),$$

(e.g., the image or text embedding that has the lowest correlation with the image embedding to be perturbed, which may maximize the change in the image embedding upon perturbation); j=random choice(j∈[B], i≠j), (e.g., selecting a random image or text embedding, which may incentivize the machine learning model to be robust against perturbation in any direction corresponding to another image or text embedding); and $$j = \underset{j \neq i}{\text{argmin}}\left(\bar{f}(I_i) \cdot \bar{v}_j\right),$$

(e.g., the image or text embedding that has the highest correlation with the image embedding to be perturbed, which may incentivize the machine learning model to draw an improved distinction between similar images or similar labels).

In some embodiments, the systems and methods described herein may be configured to, during backpropagation, remove gradients of the machine learning model weights with respect to the perturbation $\alpha v_j$ as they may produce a side effect of increasing the similarity between the text embedding corresponding to the correct label for the perturbed image and the perturbation vector, which is either an image embedding corresponding to a different label or a different label embedding (e.g., where the systems and methods described herein may be configured to achieve this using a deep learning framework by using a copy of the perturbation vector that has been detached from the computational graph).

In some embodiments, the systems and methods described herein may be configured to generate or use an image-text a machine learning model (e.g., such as a neural network) pre-trained with a contrastive loss (e.g. CLIP). The systems and methods described herein may be configured to fine-tune the machine learning model on a dataset containing images and corresponding text descriptions (e.g. names of objects present in each image). During fine-tuning, the systems and methods described herein may be configured to provide to the machine learning model batch pairs of images and text descriptions and may produce normalized image and text embeddings.

The systems and methods described herein may be configured to may perturb the embeddings produced by the machine learning model. The systems and methods described herein may be configured to use the perturbed embeddings to calculate the contrastive loss, which the systems and methods described herein may be configured to use to adjust the weights of the machine learning model to minimize the loss. The systems and methods described herein may be configured to continues as such until stopping criteria (e.g., set by a user) are met (e.g. the training stops when the maximum number of training epochs is reached, the zero-shot accuracy on a validation dataset that is not used for training has stopped declining, or the training loss has stopped declining). The systems and methods described herein may be configured to generate a fine-tuned model that achieves improved accuracy on the ID data (e.g., data that comes from the same distribution as the fine-tuning dataset) compared to the original model, while also providing an improved performance on the OoD data (e.g., data that comes from a different distribution compared to the fine-tuning dataset), and on the ID data that underwent natural corruption.

In some embodiments, the systems and methods described herein may be configured to fine-tune a pre-trained machine learning model. The systems and methods described herein may be configured to receive, from a pre-trained machine learning model, at least one image embedding corresponding to first training data used to train the pre-trained machine learning model. The systems and methods described herein may be configured to receive, from the pre-trained machine learning model, at least one text embedding corresponding to the at least one image embedding.

The systems and methods described herein may be configured to generate at least one perturbation vector that includes the at least one image embedding, the at least one text embedding, a perturbation magnitude value, and a perturbation direction value. The systems and methods described herein may be configured to generate second training data based on the at least one perturbation vector. The systems and methods described herein may be configured to fine-tune the pre-trained machine learning model using the second training data. In some embodiments, the pre-trained machine learning model is pre-trained using contrastive language-image pre-training.

In some embodiments, the systems and methods described herein may be configured to determine the perturbation magnitude value and the perturbation direction value based on at least one other image embedding corresponding to the first training data having a lowest correlation with the at least one image embedding.

In some embodiments, the systems and methods described herein may be configured to determine the perturbation magnitude value and the perturbation direction value based on at least one other text embedding corresponding to the first training data having a lowest correlation with the at least one image embedding.

In some embodiments, the systems and methods described herein may be configured to determine the perturbation magnitude value and the perturbation direction value based on at least one other randomly selected image embedding corresponding to the first training data.

In some embodiments, the systems and methods described herein may be configured to determine the perturbation magnitude value and the perturbation direction value based on at least one other randomly selected text embedding corresponding to the first training data.

In some embodiments, the systems and methods described herein may be configured to determine the perturbation magnitude value and the perturbation direction value based on at least one other image embedding corresponding to the first training data having a highest correlation with the at least one image embedding.

In some embodiments, the systems and methods described herein may be configured to determine the perturbation magnitude value and the perturbation direction value based on at least one other text embedding corresponding to the first training data having a highest correlation with the at least one image embedding.

In some embodiments, the pre-trained machine learning model, having been fine-tuned using the second training data, is configured to classify sensor data. The sensor data may be associated with at least one sensor associated with at least one machine. The at least one machine includes a vehicle and/or any suitable machine, including, but not limited to those described herein, such as those described with respect to FIGS. 5-11.

Figure 1:
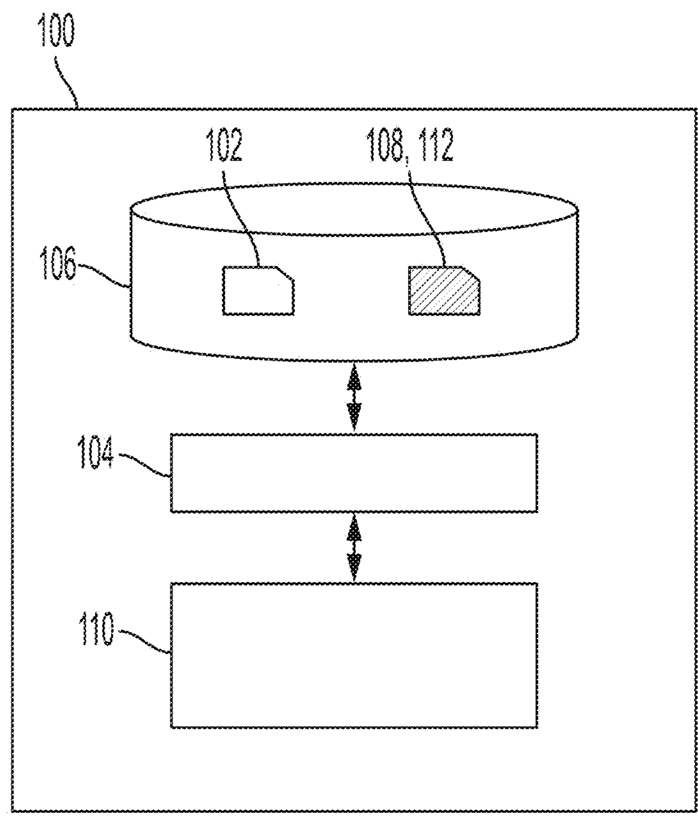
FIG. 1 generally illustrates a system for training a neural network, according to the principles of the present disclosure.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
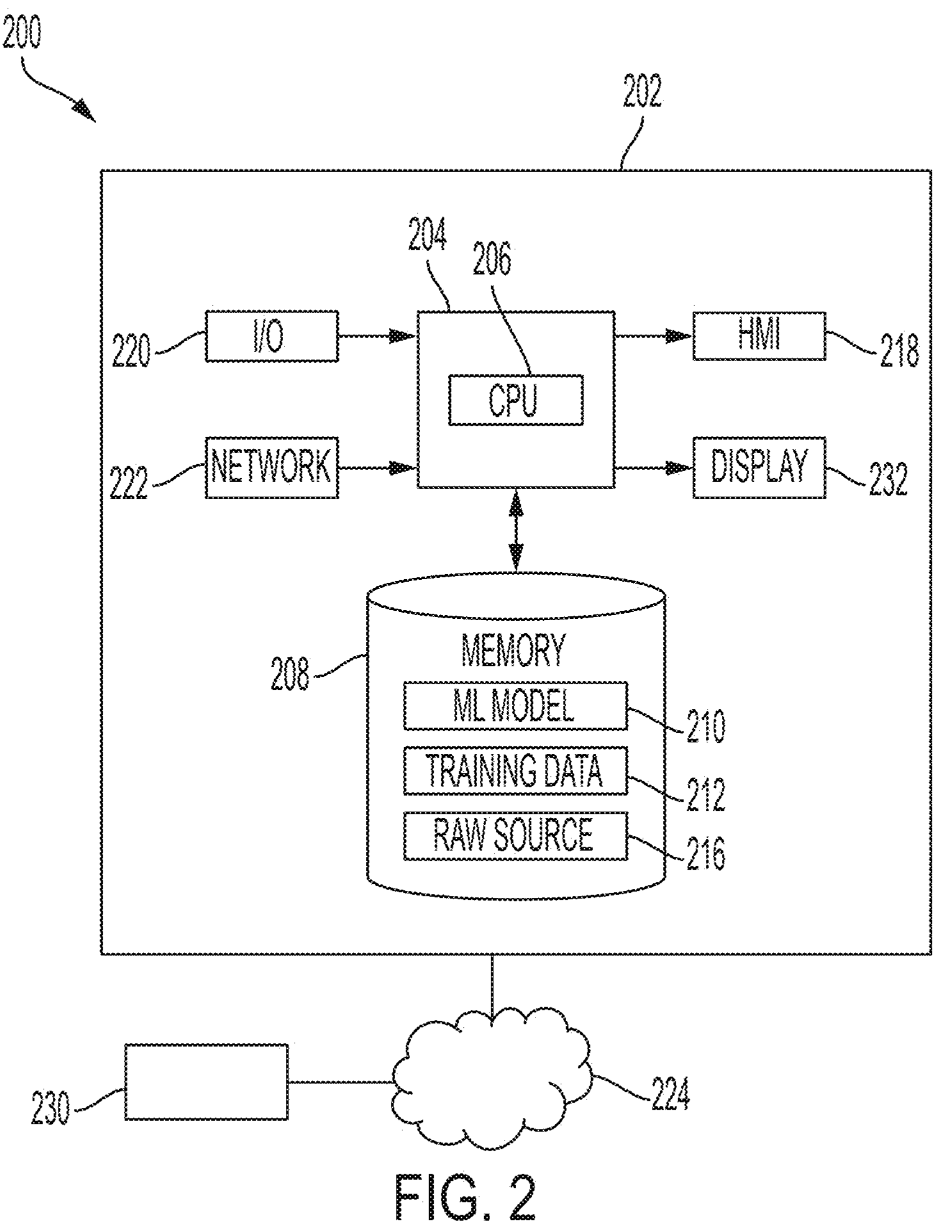
FIG. 2 generally illustrates a computer-implemented method for training and utilizing a neural network, according to the principles of the present disclosure.

FIG. 2 generally illustrates a data annotation/augmentation system 200 configured to provide embodied sound event predictions. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 (e.g., which may be referred to as the machine-learning algorithm 210) that is configured to analyze the raw source dataset 216. The raw source dataset 216 may include raw or unprocessed sensor data that may be representative of an input dataset for a machine-learning system. The raw source dataset 216 may include video, video segments, audio, audio segments, images, text-based information, and raw or partially processed sensor data (e.g., radar map of objects). In some embodiments, the machine-learning model 210 may be a neural network algorithm that is designed to perform a predetermined function. For example, the neural network algorithm may be configured in automotive applications to identify pedestrians in video images.

The computer system 200 may store a training dataset 212 for the machine-learning model 210. The training dataset 212 may represent a set of previously constructed data for training the machine-learning model 210. The training dataset 212 may be used by the machine-learning model 210 to learn weighting factors associated with a neural network algorithm. The training dataset 212 may include a set of source data that has corresponding outcomes or results that the machine-learning model 210 tries to duplicate via the learning process. In this example, the training dataset 212 may include audio data, environmental data, dialog data, other suitable data, and/or the like.

The machine-learning model 210 may be operated in a learning mode using the training dataset 212 as input. The machine-learning model 210 may be executed over a number of iterations using the data from the training dataset 212. With each iteration, the machine-learning model 210 may update internal weighting factors based on the achieved results. For example, the machine-learning model 210 can compare output results (e.g., annotations) with those included in the training dataset 212. Since the training dataset 212 includes the expected results, the machine-learning model 210 can determine when performance is acceptable. After the machine-learning model 210 achieves a predetermined performance level (e.g., 100% agreement with the outcomes associated with the training dataset 212), the machine-learning model 210 may be executed using data that is not in the training dataset 212. The trained machine-learning model 210 may be applied to new datasets to identify sound events in audio data put to the machine-learning model 210.

The machine-learning model 210 may be configured to identify a particular feature in the raw source data 216. The raw source data 216 may include a plurality of instances or input dataset for which various predictions are desired. The machine-learning model 210 may be programmed to process the raw source data 216 to identify the presence of the particular features. The machine-learning model 210 may be configured to predict, using the raw source data 216, sound events in various audio data. The raw source data 216 may be derived from a variety of sources. For example, the raw source data 216 may be actual input data collected by a machine-learning system. The raw source data 216 may be machine generated for testing the system.

In the example, the machine-learning model 210 may process raw source data 216 and output a prediction. The machine-learning model 210 may generate a confidence level (e.g., a certainty value) or factor for each output generated. For example, a confidence value that exceeds a predetermined high-confidence threshold may indicate that the machine-learning model 210 is confident that the prediction. A confidence value that is less than a low-confidence threshold may indicate that the machine-learning model 210 has some uncertainty that the prediction is accurate.

In some embodiments, the system 200 may, using a machine-learning model, such as the machine-learning model 210, receive input dialog captured by an input mechanism (e.g., such as a microphone, keyboard, and/or any other suitable input mechanism). The input dialog may include a text string corresponding to a query.

The system 200, using the machine-learning model 210, may extract, using at least one functional map, at least one keyword from the text string. The at least one functional map may correspond to a neural functional approximator and/or may correlate one or more maps associated with one or more image inputs with corresponding region and object labels. The system 200, using the machine-learning model 210, may generate at least one action prediction based on an input state representation and the at least one keyword. The at least one action prediction may include an action to navigate at least a portion of the environment associated with the machine-learning model 210 and/or other suitable action. The system 200 may predict any suitable number of actions for traversing the environment.

The system 200 may receive, via an image capturing device, one or more images associated with the environment. The system 200, using the machine-learning model 210, may provide a prediction, using the one or more images, identifying one or more objects in the one or more images. Additionally, or alternatively, the system 200 may receive various audio data. The system 200, using the machine learning model 210, may provide a prediction, using the various audio data, identifying target sound event of the various audio data. The system 200 may provide, at an output mechanism (e.g., such as the display 232, HMI 218, I/o 220, or any other suitable mechanism), the prediction.

The system 200 may store, in an associated memory, such as the memory 208 or other suitable memory, the text string, the at least one sub-goal, any other suitable date or information, or a combination thereof. The system 200 may receive feedback in response to providing the prediction. For example, a user of the system 200 may provide verbal, textual or other suitable feedback (e.g., as an input) based on the perspective of the user that the prediction is accurate or correct. The system 200 may subsequently train the machine-learning model 210 based on the feedback (e.g., in order to improve future predations).

In some embodiments, the system 200 may be configured to fine-tune a pre-trained machine learning model, such as the machine learning model 210. As described, the machine learning model 210 may include a CLIP machine learning model or other suitable machine learning model and may be trained or pre-trained as described herein. The system 200 may receive, from the machine learning model 210, at least one image embedding corresponding to first training data used to train the machine learning model 210. The system 200 may receive, from the machine learning model 210, at least one text embedding corresponding to the at least one image embedding.

The system 200 may generate at least one perturbation vector that includes the at least one image embedding, the at least one text embedding, a perturbation magnitude value, and a perturbation direction value. The system 200 may generate second training data based on the at least one perturbation vector. The system 200 may fine-tune the machine learning model 210 using the second training data.

In some embodiments, system 200 may determine the perturbation magnitude value and the perturbation direction value based on at least one other image embedding corresponding to the first training data having a lowest correlation with the at least one image embedding.

In some embodiments, system 200 may determine the perturbation magnitude value and the perturbation direction value based on at least one other text embedding corresponding to the first training data having a lowest correlation with the at least one image embedding.

In some embodiments, system 200 may determine the perturbation magnitude value and the perturbation direction value based on at least one other randomly selected image embedding corresponding to the first training data.

In some embodiments, system 200 may determine the perturbation magnitude value and the perturbation direction value based on at least one other randomly selected text embedding corresponding to the first training data.

In some embodiments, system 200 may determine the perturbation magnitude value and the perturbation direction value based on at least one other image embedding corresponding to the first training data having a highest correlation with the at least one image embedding.

In some embodiments, system 200 may determine the perturbation magnitude value and the perturbation direction value based on at least one other text embedding corresponding to the first training data having a highest correlation with the at least one image embedding.

In some embodiments, the machine learning model 210, having been fine-tuned using the second training data, is configured to classify sensor data. The sensor data may be associated with at least one sensor associated with at least one machine. The at least one machine includes a vehicle and/or any suitable machine, including, but not limited to those described herein, such as those described with respect to FIGS. 5-11.

It should be understood that the systems and methods described herein may be configured to perform any suitable function, such as those described herein with respect to FIGS. 5-11.

Figure 4:
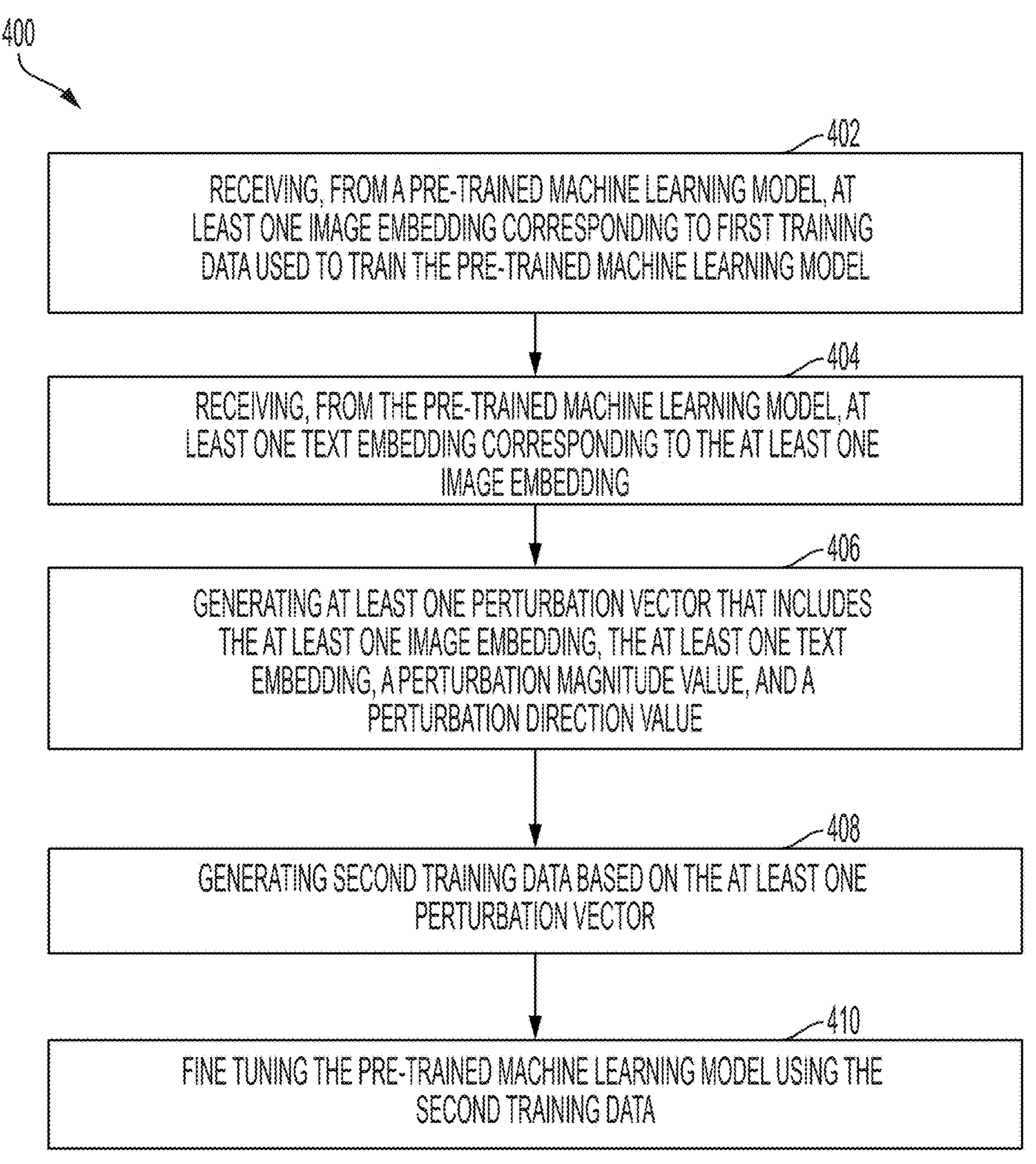
FIG. 4 is a flow diagram generally illustrating a machine learning fine-tuning method, according to the principles of the present disclosure.

FIG. 4 is a flow diagram generally illustrating a machine learning model fine-tuning method 400 according to the principles of the present disclosure. It should be understood that any of the systems described herein, including, but not limited to, the system 200, may be configured to perform the methods described herein. At 402, the method 400 receives, from a pre-trained machine learning model, at least one image embedding corresponding to first training data used to train the pre-trained machine learning model.

At 404, the method 400 receives, from the pre-trained machine learning model, at least one text embedding corresponding to the at least one image embedding.

At 406, the method 400 generates at least one perturbation vector that includes the at least one image embedding, the at least one text embedding, a perturbation magnitude value, and a perturbation direction value.

At 408, the method 400 generates second training data based on the at least one perturbation vector.

At 410, the method 400 fine-tunes the pre-trained machine learning model using the second training data.

Figure 5:
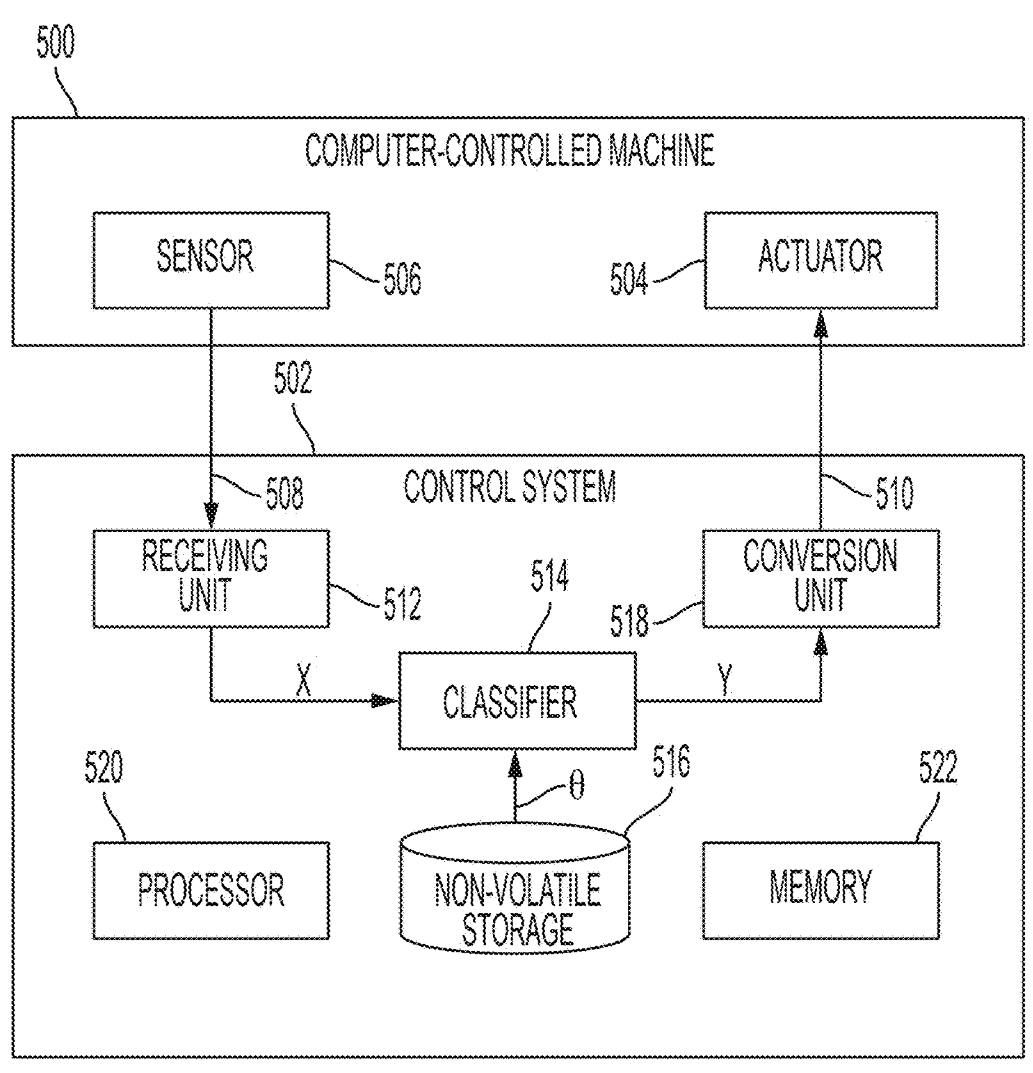
FIG. 5 depicts a schematic diagram of an interaction between a computer-controlled machine and a control system, according to the principles of the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
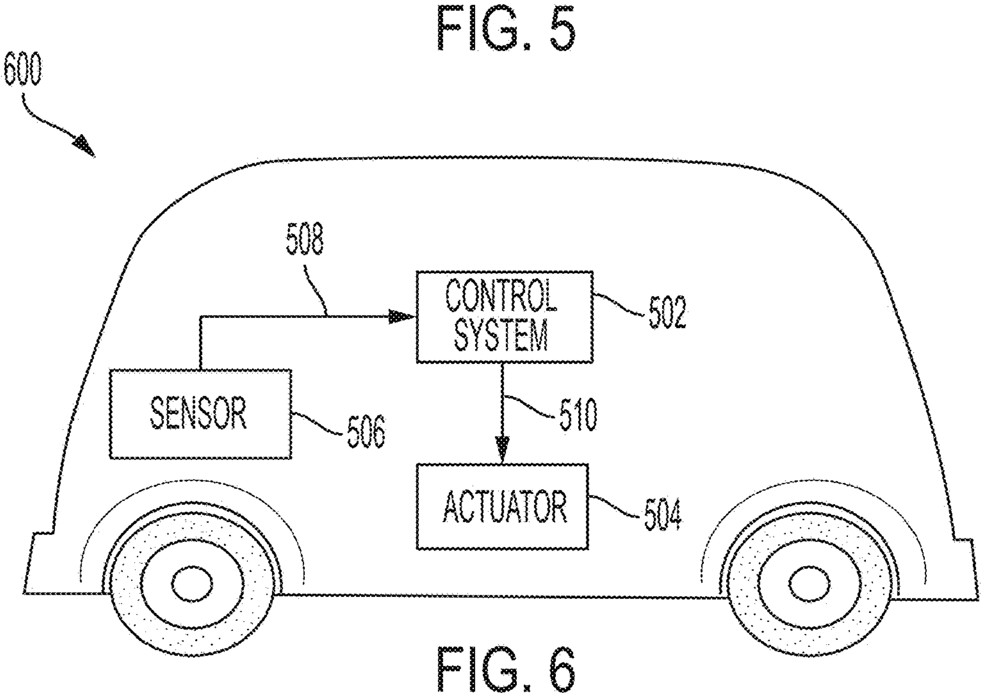
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
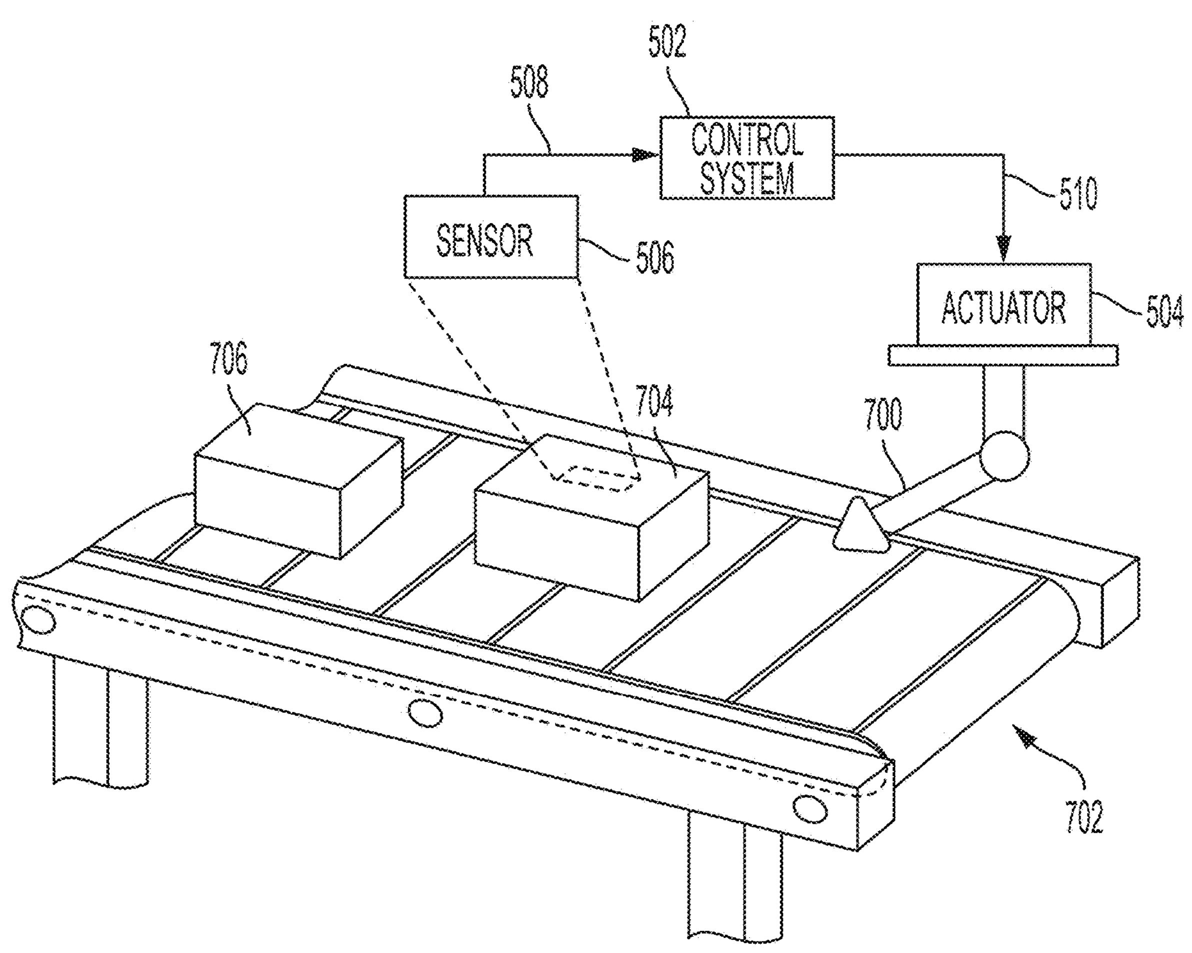
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
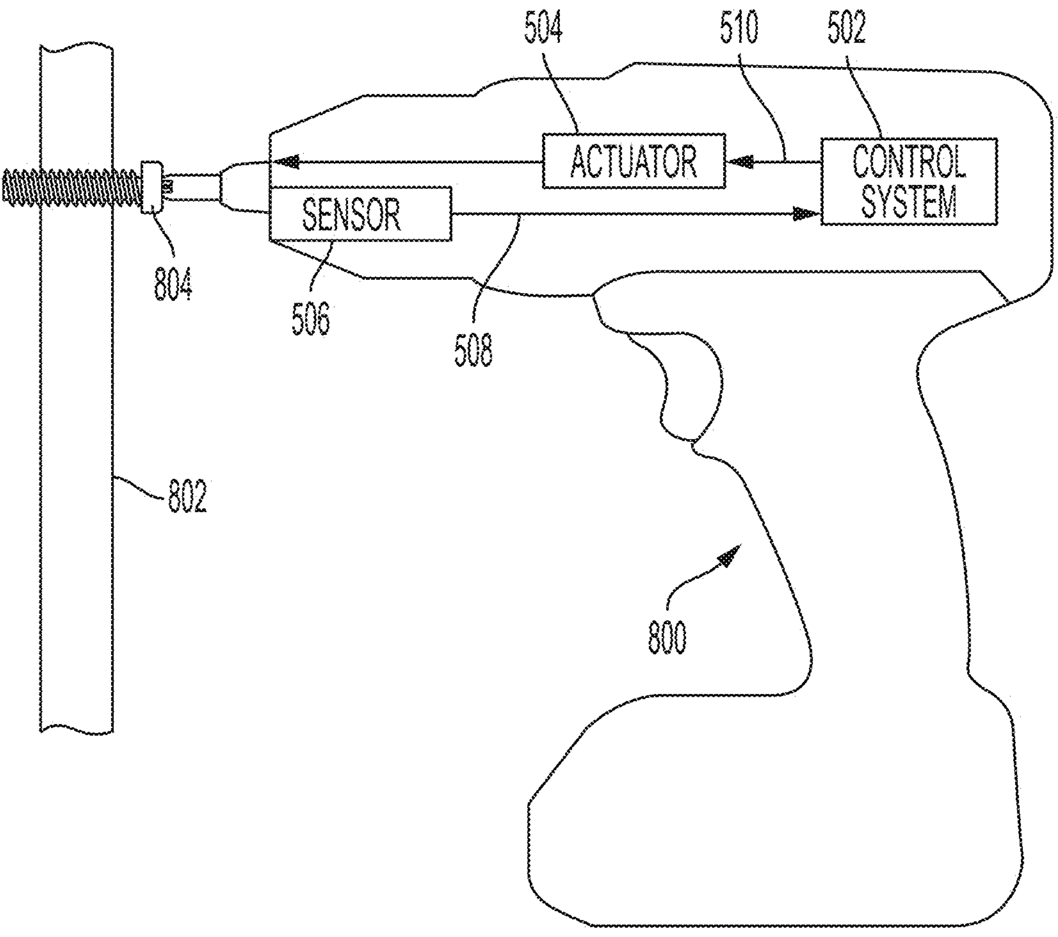
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figures 9, 10:
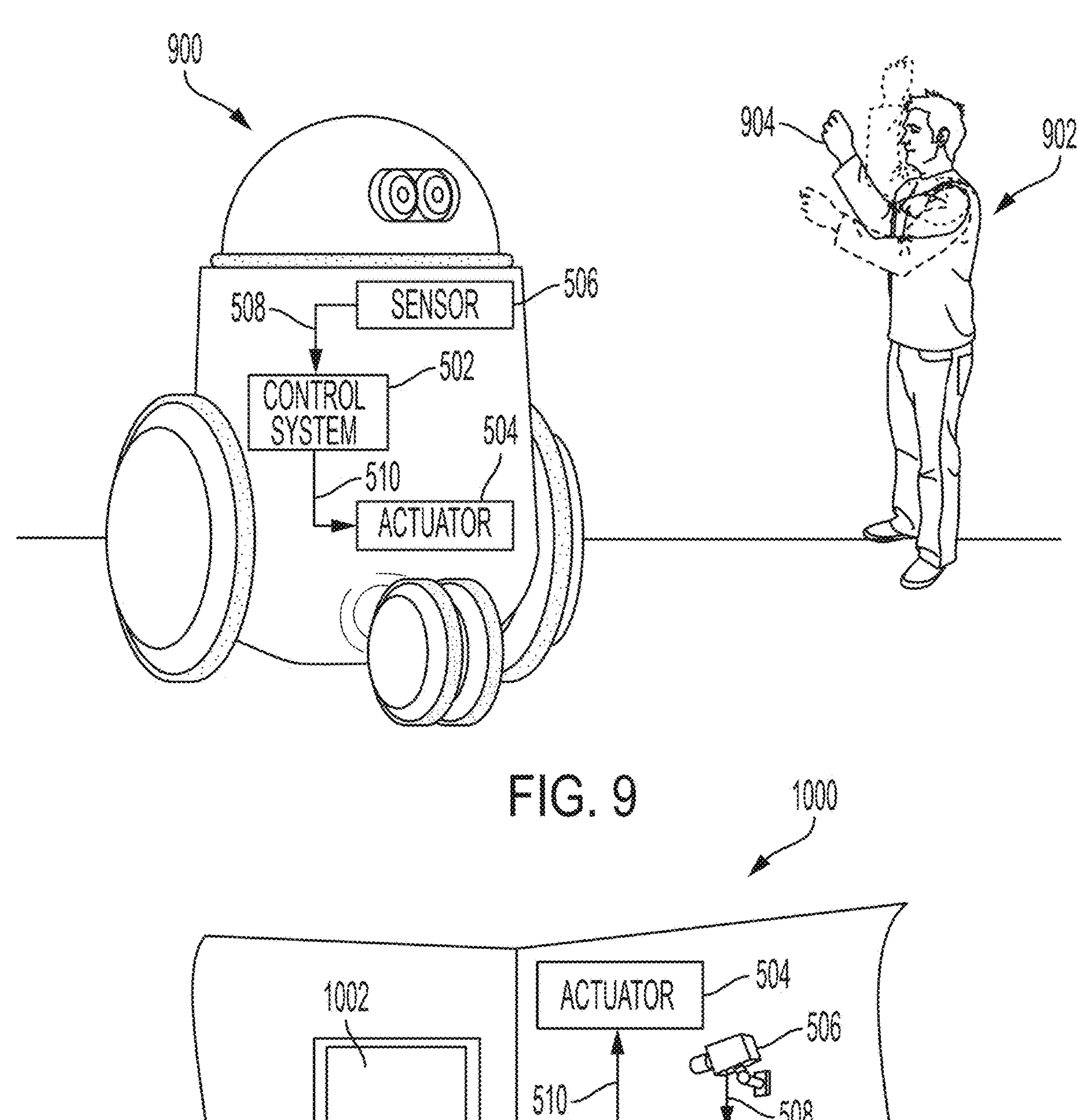
FIG. 9 depicts a schematic diagram of the control system of FIG. 5 configured to control an automated personal assistant.
FIG. 10 depicts a schematic diagram of the control system of FIG. 5 configured to control a monitoring system, such as a control access system or a surveillance system.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
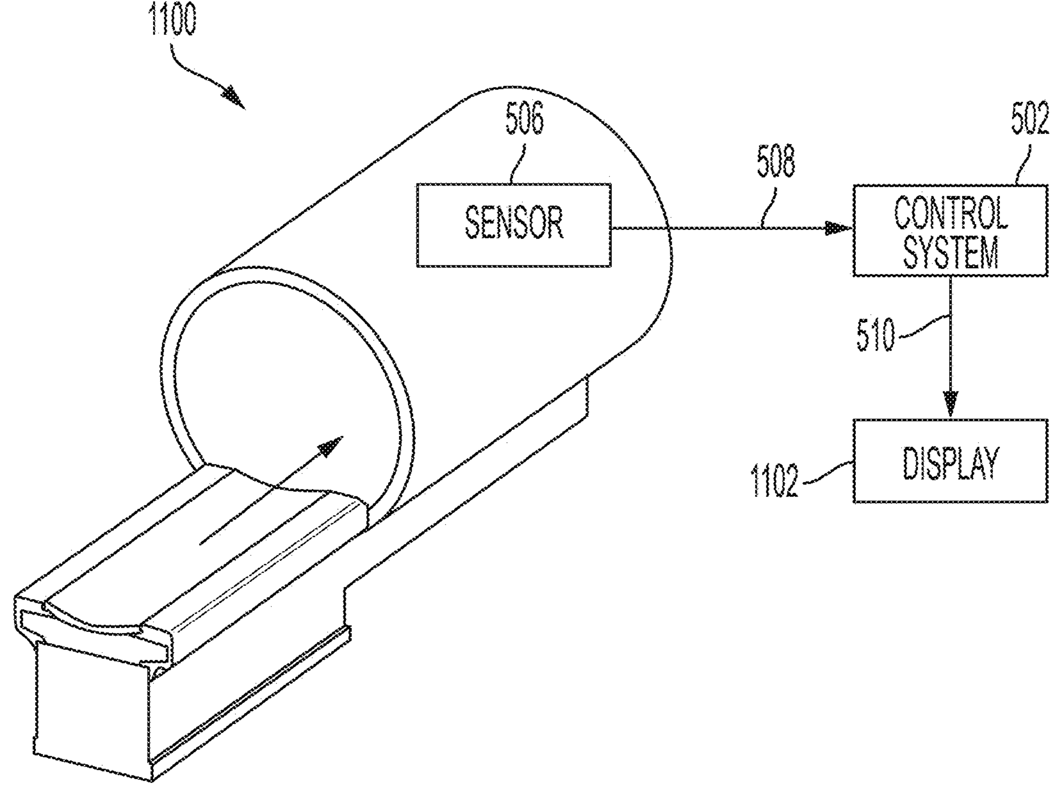
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments, a method for fine tuning a pre-trained machine learning model includes receiving, from a pre-trained machine learning model, at least one image embedding corresponding to first training data used to train the pre-trained machine learning model. The method also includes receiving, from the pre-trained machine learning model, at least one text embedding corresponding to the at least one image embedding. The method also includes generating at least one perturbation vector that includes the at least one image embedding, the at least one text embedding, a perturbation magnitude value, and a perturbation direction value. The method also includes generating second training data based on the at least one perturbation vector, and fine tuning the pre-trained machine learning model using the second training data.

In some embodiments, the method also includes determining the perturbation magnitude value and the perturbation direction value based on at least one other image embedding corresponding to the first training data having a lowest correlation with the at least one image embedding. In some embodiments, the method also includes determining the perturbation magnitude value and the perturbation direction value based on at least one other text embedding corresponding to the first training data having a lowest correlation with the at least one image embedding. In some embodiments, the method also includes determining the perturbation magnitude value and the perturbation direction value based on at least one other randomly selected image embedding corresponding to the first training data. In some embodiments, the method also includes determining the perturbation magnitude value and the perturbation direction value based on at least one other randomly selected text embedding corresponding to the first training data. In some embodiments, the method also includes determining the perturbation magnitude value and the perturbation direction value based on at least one other image embedding corresponding to the first training data having a highest correlation with the at least one image embedding. In some embodiments, the method also includes determining the perturbation magnitude value and the perturbation direction value based on at least one other text embedding corresponding to the first training data having a highest correlation with the at least one image embedding. In some embodiments, the pre-trained machine learning model is pre-trained using contrastive language-image pre-training. In some embodiments, the pre-trained machine learning model, having been fine-tuned using the second training data, is configured to classify sensor data. In some embodiments, the sensor data is associated with at least one sensor associated with at least one machine. In some embodiments, the at least one machine includes a vehicle.

In some embodiments, a system for fine tuning a pre-trained machine learning model includes a processor, and a memory. The memory includes instructions that, when executed by the processor, cause the processor to: receive, from a pre-trained machine learning model, at least one image embedding corresponding to first training data used to train the pre-trained machine learning model; receive, from the pre-trained machine learning model, at least one text embedding corresponding to the at least one image embedding; generate at least one perturbation vector that includes the at least one image embedding, the at least one text embedding, a perturbation magnitude value, and a perturbation direction value; generate second training data based on the at least one perturbation vector; and fine tune the pre-trained machine learning model using the second training data.

In some embodiments, the instructions further cause the processor to determine the perturbation magnitude value and the perturbation direction value based on at least one other image embedding corresponding to the first training data having a lowest correlation with the at least one image embedding. In some embodiments, the instructions further cause the processor to determine the perturbation magnitude value and the perturbation direction value based on at least one other text embedding corresponding to the first training data having a lowest correlation with the at least one image embedding. In some embodiments, the instructions further cause the processor to determine the perturbation magnitude value and the perturbation direction value based on at least one other randomly selected image embedding corresponding to the first training data. In some embodiments, the instructions further cause the processor to determine the perturbation magnitude value and the perturbation direction value based on at least one other randomly selected text embedding corresponding to the first training data. In some embodiments, the instructions further cause the processor to determine the perturbation magnitude value and the perturbation direction value based on at least one other image embedding corresponding to the first training data having a highest correlation with the at least one image embedding. In some embodiments, the instructions further cause the processor to determine the perturbation magnitude value and the perturbation direction value based on at least one other text embedding corresponding to the first training data having a highest correlation with the at least one image embedding. In some embodiments, the pre-trained machine learning model is pre-trained using contrastive language-image pre-training.

In some embodiments, an apparatus for controlling a machine includes a processor, and a memory. The memory includes instructions that, when executed by the processor, cause the processor to: receive, from a pre-trained machine learning model, at least one image embedding corresponding to first training data used to train the pre-trained machine learning model; receive, from the pre-trained machine learning model, at least one text embedding corresponding to the at least one image embedding; generate at least one perturbation vector that includes the at least one image embedding, the at least one text embedding, a perturbation magnitude value, and a perturbation direction value; generate second training data based on the at least one perturbation vector; fine tune the pre-trained machine learning model using the second training data; receive, from the fine-tuned pre-trained machine learning model, classified sensor data corresponding to at least one sensor of machine; and selectively controlling the machine based on the classified sensor data.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for fine tuning a pre-trained machine learning model, the method comprising:

receiving, from a pre-trained machine learning model, at least one image embedding corresponding to first training data used to train the pre-trained machine learning model, wherein the at last one image embedding is from an image encoder;

receiving, from the pre-trained machine learning model, at least one text embedding corresponding to the at least one image embedding, wherein the at last one text embedding is from a text encoder, wherein the image encoder and text encoder are part of the pre-trained machine learning model;

generating at least one perturbation vector that includes each of the at least one image embedding, the at least one text embedding, a perturbation magnitude value, and a perturbation direction value;

generating second training data based on the at least one perturbation vector; and fine tuning the pre-trained machine learning model using the second training data, wherein the fine tuning is accomplished in response to zero-shot classification without updating any weights of the pre-trained machine learning model.

2. The method of claim 1, further comprising determining the perturbation magnitude value and the perturbation direction value based on at least one other image embedding corresponding to the first training data having a lowest correlation with the at least one image embedding.

3. The method of claim 1, further comprising determining the perturbation magnitude value and the perturbation direction value based on at least one other text embedding corresponding to the first training data having a lowest correlation with the at least one image embedding.

4. The method of claim 1, further comprising determining the perturbation magnitude value and the perturbation direction value based on at least one other randomly selected image embedding corresponding to the first training data.

5. The method of claim 1, further comprising determining the perturbation magnitude value and the perturbation direction value based on at least one other randomly selected text embedding corresponding to the first training data.

6. The method of claim 1, further comprising determining the perturbation magnitude value and the perturbation direction value based on at least one other image embedding corresponding to the first training data having a highest correlation with the at least one image embedding.

7. The method of claim 1, further comprising determining the perturbation magnitude value and the perturbation direction value based on at least one other text embedding corresponding to the first training data having a highest correlation with the at least one image embedding.

8. The method of claim 1, wherein the pre-trained machine learning model is pre-trained using contrastive language-image pre-training.

9. The method of claim 1, wherein the pre-trained machine learning model, having been fine-tuned using the second training data, is configured to classify sensor data.

10. The method of claim 9, wherein the sensor data is associated with at least one sensor associated with at least one machine.

11. The method of claim 10, wherein the at least one machine includes a vehicle.

12. A system for fine tuning a pre-trained machine learning model, the system comprising:

a processor; and a memory including instructions that, when executed by the processor, cause the processor to:

receive, from a pre-trained machine learning model, at least one image embedding corresponding to first training data used to train the pre-trained machine learning model;

receive, from the pre-trained machine learning model, at least one text embedding corresponding to the at least one image embedding;

generate at least one perturbation vector that includes each of the at least one image embedding, the at least one text embedding, a perturbation magnitude value, and a perturbation direction value;

generate second training data based on the at least one perturbation vector; and fine tune the pre-trained machine learning model using the second training data, wherein the fine tuning is accomplished in response to zero-shot classification without updating any weights of the pre-trained machine learning model.

13. The system of claim 12, wherein the instructions further cause the processor to determine the perturbation magnitude value and the perturbation direction value based on at least one other image embedding corresponding to the first training data having a lowest correlation with the at least one image embedding.

14. The system of claim 12, wherein the instructions further cause the processor to determine the perturbation magnitude value and the perturbation direction value based on at least one other text embedding corresponding to the first training data having a lowest correlation with the at least one image embedding.

15. The system of claim 12, wherein the instructions further cause the processor to determine the perturbation magnitude value and the perturbation direction value based on at least one other randomly selected image embedding corresponding to the first training data.

16. The system of claim 12, wherein the instructions further cause the processor to determine the perturbation magnitude value and the perturbation direction value based on at least one other randomly selected text embedding corresponding to the first training data.

17. The system of claim 12, wherein the instructions further cause the processor to determine the perturbation magnitude value and the perturbation direction value based on at least one other image embedding corresponding to the first training data having a highest correlation with the at least one image embedding.

18. The system of claim 12, wherein the instructions further cause the processor to determine the perturbation magnitude value and the perturbation direction value based on at least one other text embedding corresponding to the first training data having a highest correlation with the at least one image embedding.

19. The system of claim 12, wherein the pre-trained machine learning model is pre-trained using contrastive language-image pre-training.

20. An apparatus for controlling a machine, the apparatus comprising:

a processor; and a memory including instructions that, when executed by the processor, cause the processor to:

receive, from a pre-trained machine learning model, at least one image embedding corresponding to first training data used to train the pre-trained machine learning model;

receive, from the pre-trained machine learning model, at least one text embedding corresponding to the at least one image embedding;

generate at least one perturbation vector that includes all of the following: the at least one image embedding, the at least one text embedding, a perturbation magnitude value, and a perturbation direction value;

generate second training data based on the at least one perturbation vector;

fine tune the pre-trained machine learning model using the second training data, wherein the fine tuning is accomplished in response to zero-shot classification without updating any weights of the pre-trained machine learning model;

receive, from the fine-tuned pre-trained machine learning model, classified sensor data corresponding to at least one sensor of machine; and selectively controlling the machine based on the classified sensor data.

* * * * *